(12) United States Patent
Ogino

(10) Patent No.: US 8,521,015 B2
(45) Date of Patent: Aug. 27, 2013

(54) AUTOFOCUS APPARATUS AND METHOD FOR CONTROLLING THE SAME

(75) Inventor: Hiroyuki Ogino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/558,358

(22) Filed: Sep. 11, 2009

(65) Prior Publication Data

US 2010/0067890 A1    Mar. 18, 2010

(30) Foreign Application Priority Data

Sep. 13, 2008 (JP) .................. 2008-235786

(51) Int. Cl.
*G03B 13/36* (2006.01)
*G03B 3/10* (2006.01)

(52) U.S. Cl.
USPC ................ 396/104; 396/127; 348/353

(58) Field of Classification Search
USPC ............... 396/79, 80, 82, 104, 139; 359/823; 348/345, 349
See application file for complete search history.

(56) References Cited

U.S. PATENT DOCUMENTS

| | | | |
|---|---|---|---|
| 6,430,368 B1 * | 8/2002 | Hata | 396/79 |
| 7,991,280 B2 * | 8/2011 | Ogino | 396/98 |
| 2006/0109370 A1 * | 5/2006 | Yamazaki | 348/345 |

FOREIGN PATENT DOCUMENTS

| | | |
|---|---|---|
| JP | 11-326744 A | 11/1999 |
| JP | 2002-214517 A | 7/2002 |
| JP | 2003-156679 A | 5/2003 |
| JP | 2003-315669 A | 11/2003 |
| JP | 2006-201283 A | 8/2006 |
| JP | 2006-293383 A | 10/2006 |

* cited by examiner

*Primary Examiner* — Clayton E Laballe
*Assistant Examiner* — Leon W Rhodes, Jr.
(74) *Attorney, Agent, or Firm* — Canon U.S.A., Inc. IP Division

(57) ABSTRACT

An autofocus apparatus includes an imaging unit configured to capture an object image entered through a focus lens and output image data, a detection unit configured to detect a focus signal based on the image data, a focus adjustment unit configured to perform a focus adjusting operation for adjusting a position of the focus lens based on the detected focus signal, an acquisition unit configured to acquire information relating to a distance to an object, and a change unit configured to change at least one of a time interval, a movable range of the focus lens in acquiring the focus signal in the subsequent focus adjusting operation, and an amount of movement of the focus lens in acquiring the focus signal in the subsequent focus adjusting operation, according to the information relating to the distance to the object.

14 Claims, 10 Drawing Sheets

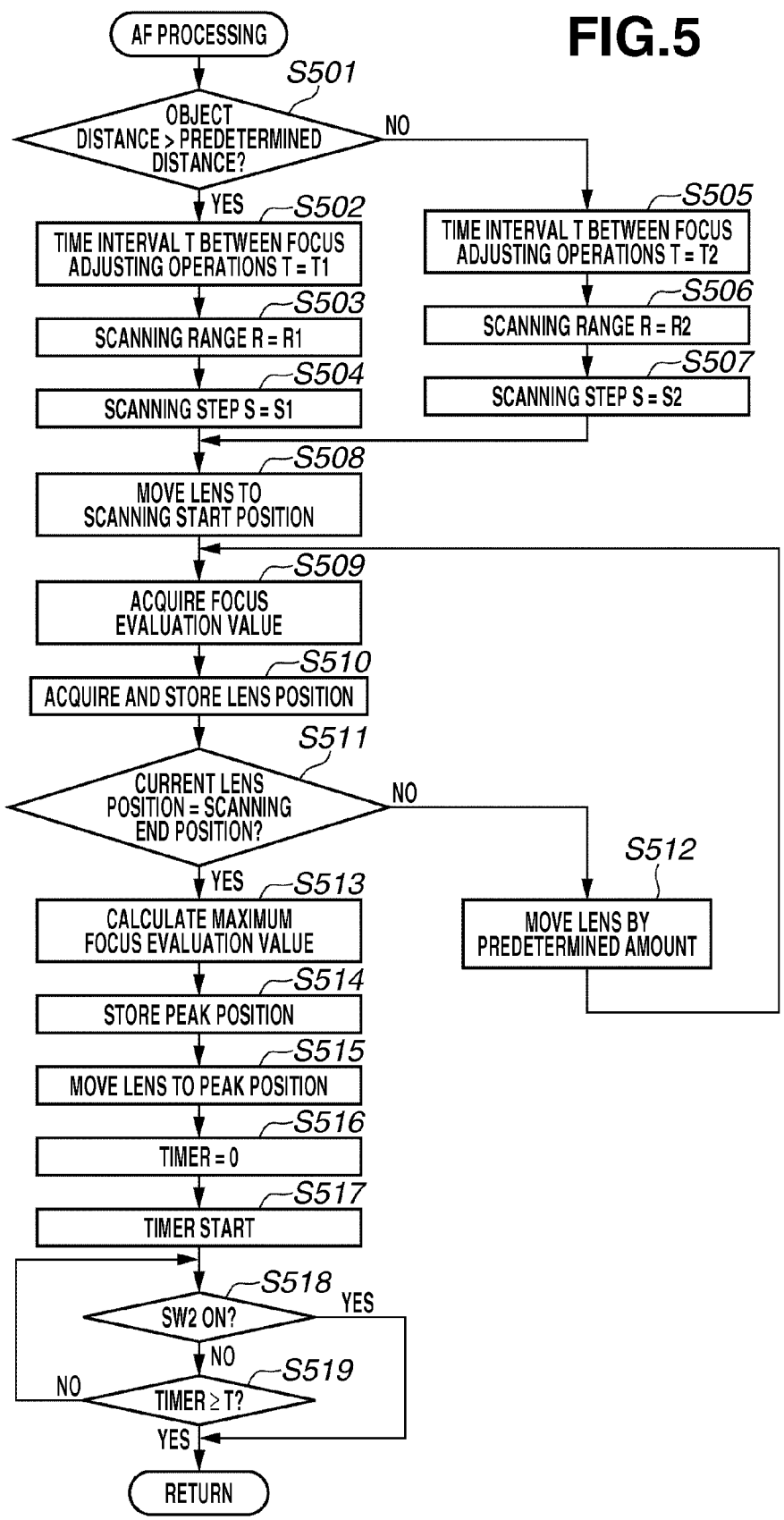

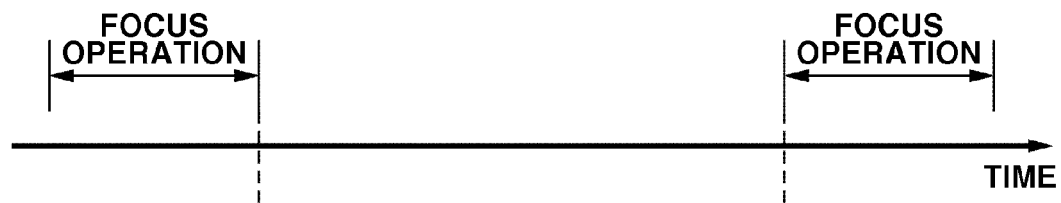
FIG.6A
FARTHER THAN PREDETERMINED DISTANCE
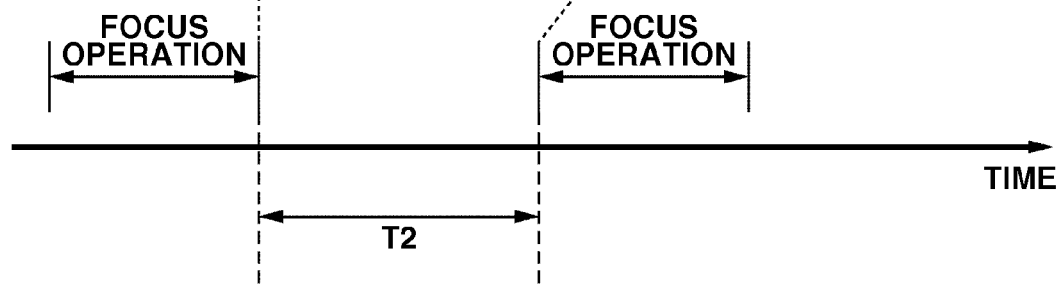
FIG.6B
CLOSER THAN PREDETERMINED DISTANCE
FIG.7
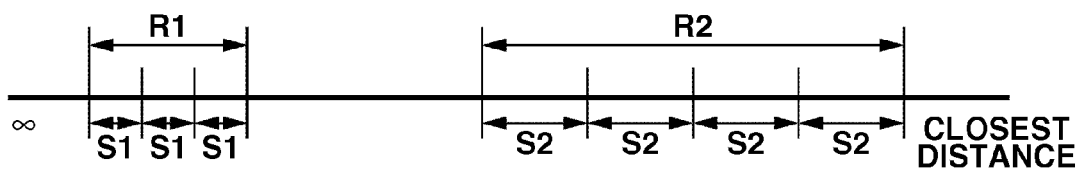

FOCUS STATE = OK

FOCUS STATE = NG

AUTOFOCUS APPARATUS AND METHOD FOR CONTROLLING THE SAME

BACKGROUND OF THE INVENTION

1. Field of the Invention

The present invention relates to an autofocus apparatus for a camera and a method for controlling the same.

2. Description of the Related Art

Autofocus (AF) systems for moving a focus lens to a position where a maximum value of high-frequency components of a luminance signal output from an image sensor can be obtained as an in-focus position have been conventionally used for electronic still cameras and video cameras. An example of the AF system includes a hill-climbing system for moving a focus lens in a direction in which focus evaluation value based on high-frequency components of a luminance signal obtained from an image sensor (hereinafter referred to as a focus signal) increases and a position where the focus signal reaches its maximum value is determined to be an in-focus position.

Another example of the AF system includes a scanning system for moving a focus lens over the entire area within a movable range of a focus lens while storing a focus signal each time and determining a lens position where the maximum focus signal is obtained among the stored focus signals to be an in-focus position.

In this case, limiting the scanning range of a focus lens to a part thereof allows a time period to complete an auto-focus operation to be shorter than that when scanning the entire area thereof.

Japanese Patent Application Laid-Open No. 2006-293383 discusses a method for determining a target range when a part of a movable range of a focus lens is scanned. In this case, there is provided a photoelectric conversion unit different from an image sensor. The photoelectric conversion unit detects a distance between an imaging apparatus and an object to detect an in-focus position. A range in which the focus lens is moved is set based on the in-focus position.

Furthermore, the range is set narrower at a wide end side, while being set to widen toward a telephoto end according to the focal length of the lens.

On the other hand, a technique for repeatedly performing a focus adjusting operation for a moving object to keep an in focus-state has been known.

When the focus adjusting operation is repeatedly performed as described above, even if the amount of movement of the object is substantially constant, the amount of movement of the image forming position of an object image that has passed through an imaging lens differs depending on the distance to the object. The reason for this is the depth of field of the imaging lens.

Even if the amount of movement of the object is constant, for example, when the distance to the object is far, the depth of field is deep, so that the amount of movement of the image forming position is small. The reason for this is that when the distance to the object is near, the depth of field is narrow, so that the amount of movement of the image forming position is large.

Therefore, a time period required until when an object image is substantially defocused, that is, in an out-of-focus state, when the object moves out of the depth of field from the in-focus state, differs depending on the distance to the object.

When this is not taken into consideration to determine a time interval between a focus adjusting operation and a subsequent focus adjusting operation, i.e., a time interval in repeating the focus adjusting operation, to be constant regardless of the distance to the object, the following situations may arise.

That is, the focus adjusting operation is performed even when an object is at a far distance and within the depth of field. In contrast, the focus adjusting operation is not performed even when the object is at a near distance and out of the depth of field.

This results in situations that the object image is out-of-focus because the focus adjusting operation is unnecessarily performed, though the focus adjusting operation is not performed, while not performed when the focus adjusting operation must be performed.

Similarly when the movable range of the focus lens is set to be constant regardless of the distance to the object, a wider range may be scanned even though the amount of movement of focus position is small.

Conversely, a narrow range may be scanned even when the movable range is wide. As a result, a time period for focus adjustment is uselessly becomes longer. Alternatively, the object image cannot be in focus because the focus position is not included in the scanning range.

Similarly when the amount of movement of the focus lens is set to be constant regardless of the distance to the object, the amount of movement of the focus lens may be increased to scan a wider range even when the amount of movement of the focus position is small.

In contrast, the amount of movement of the focus lens may be decreased to scan a narrower range even when the movable range is wider. As a result, the time period for focus adjustment may become uselessly longer. Alternatively, the object image cannot be in focus because the focus position cannot be obtained.

Similarly when the focus adjusting operation is repeatedly performed, the time period for focus adjustment may become uselessly longer or the object image cannot be in-focus because the focus position cannot be obtained unless the time interval between the focus adjusting operation and the subsequent focus adjusting operation, the movable range in which the focus lens is moved, or the amount of movement of the focus lens is set in consideration of focus information indicating whether or not the object image is focused last time.

SUMMARY OF THE INVENTION

According to an aspect of the present invention, an autofocus apparatus comprising, an imaging unit configured to capture an object image entered through a focus lens and output image data, a detection unit configured to detect a focus signal representing a focus state of the focus lens based on the image data, a focus adjustment unit configured to perform an focus adjusting operation for adjusting a position of the focus lens based on the detected focus signal detected, an acquisition unit configured to acquire information relating to a distance to an object, and a change unit configured to change at least one of a time interval from a time when the focus adjusting operation is performed to a time when the subsequent focus adjusting operation is performed, a movable range of the focus lens in acquiring the focus signal in the subsequent focus adjusting operation, and an amount of movement of the focus lens in acquiring the focus signal in the subsequent focus adjusting operation, according to the information relating to the distance to the object. According to another aspect of the present invention, an apparatus includes an imaging unit configured to capture an object image entered through a focus lens and output image data, a detection unit configured to detect a focus signal based on the image data, a focus adjustment unit configured to perform a focus adjusting operation for adjusting a position of the focus lens based on the detected focus signal, an acquisition unit configured to acquire information relating to a distance to an object, and a change unit configured to change at least one of a time interval, a movable range of the focus lens in acquiring the focus signal in the subsequent focus adjusting operation, and an amount of movement of the focus lens in acquiring the focus signal in the subsequent focus adjusting operation, according to the information relating to the distance to the object.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a flowchart illustrating a procedure for AF processing according to the first exemplary embodiment.

FIG. 6 illustrates a time interval between focus adjusting operations to be set in the AF processing according to the first exemplary embodiment.

FIG. 7 illustrates a scanning range and a scanning step to be set in the AF processing according to the first exemplary embodiment.

DETAILED DESCRIPTION OF THE EMBODIMENTS

Various exemplary embodiments, features, and aspects of the invention will be described in detail below with reference to the drawings.

Figure 1:
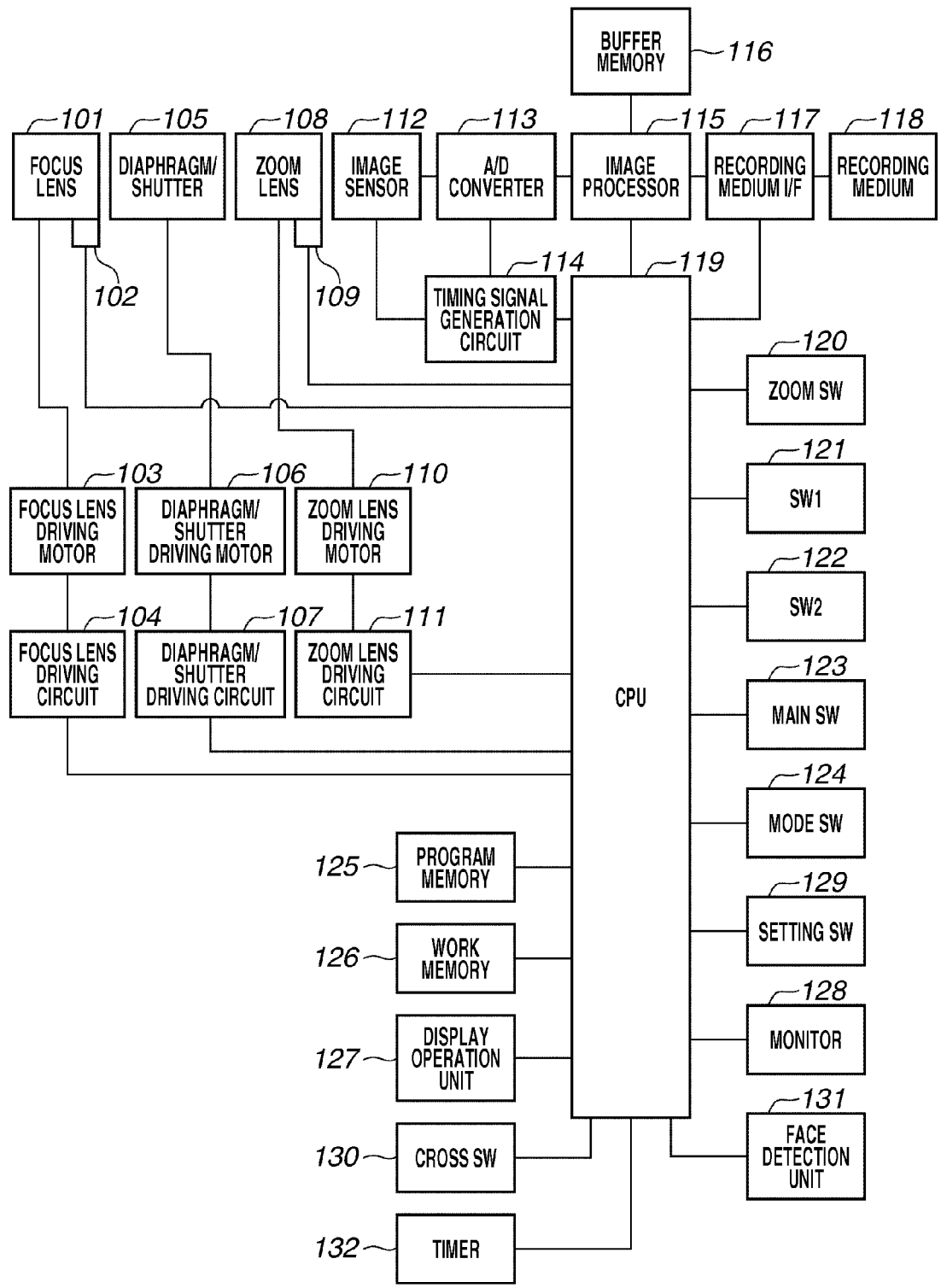
FIG. 1 is a block diagram illustrating a functional configuration of an electronic camera (imaging apparatus) according to a first exemplary embodiment.

FIG. 1 is block diagram illustrating an example configuration of an electronic camera (hereinafter referred to as a camera) according to a first exemplary embodiment of the present invention.

The camera includes an imaging optical system including various types of lenses and optical members. The imaging optical system includes a focus lens 101 for focusing an object image on an image sensor serving as a photoelectric conversion unit, described later, and a photointerrupter 102 for detecting initial position of the focus lens 101.

Furthermore, the camera includes a focus lens driving motor 103 for driving the focus lens 101 and a focus lens driving circuit 104 for moving the focus lens 101 by applying a driving signal to the focus lens driving motor 103.

The imaging optical system further includes a diaphragm/shutter 105 (a light quantity control member). Furthermore, the imaging optical system includes a diaphragm/shutter driving motor 106 for driving a diaphragm/shutter 105, and a diaphragm/shutter driving circuit 107 for moving the diaphragm/shutter 105 by applying a driving signal to the diaphragm/shutter driving motor 106.

The imaging optical system includes a zoom lens 108 for changing the focal length of an imaging lens, and a photointerrupter 109 for detecting an initial position of the zoom lens 108. Furthermore, the imaging optical system includes a zoom lens driving motor 110 for driving the zoom lens 108, and a zoom lens driving circuit 111 for moving the zoom lens 108 by applying a driving signal to the motor 110.

The imaging optical system includes an image sensor 112 for converting light reflected from an object into an electric signal, and an analog-to-digital (A/D) converter 113 for converting an analog signal output from the image sensor 112 into a digital signal. In this configuration example, the image sensor 112 has the function of converting a formed object image into an electric signal. Furthermore, the camera includes a timing signal generation circuit 114 for generating a timing signal to operate the image sensor 112 and the A/D converter 113.

An image processor 115 mainly performers predetermined processing of image data input from the A/D converter 113. The image processor 115 has the function of extracting signal components within a particular frequency band associated with the luminance of the object from an output signal of the image sensor 112.

The camera includes a buffer memory 116 temporarily storing the image data processed by the image processor 115, and an interface 117 (i.e., recording medium interface) for connection to a recording medium 118, described later. Information can be read from or written into the recording medium 118 such as a memory card or a hard disk.

The operation of the entire camera is controlled using a micro processing unit (hereinafter referred to as a CPU or central processing unit) 119 for controlling a system such as an imaging sequence in this example. The CPU 119 has the function of reading out a focusing control program from a program memory, described later, and executing the focusing control program. Signals from various types of operation units are input to the CPU 119.

Examples of the operation units include a zoom switch (SW) 120 for inputting a signal for issuing an instruction to start and stop a zooming operation to the CPU 119, and an imaging preparation instruction switch (hereinafter referred to as SW1) 121 for issuing an instruction to prepare imaging such as automatic focusing (AF) and automatic exposure (AE).

Examples of the operation units further include an imaging processing instruction switch (hereinafter referred to as SW2) 122 for issuing an instruction to perform imaging processing such as main exposure and recoding after the SW1 is operated, a main switch (SW) 123 for turning on the power to the system, and a mode switch (SW) 124 for setting an operation mode of the camera.

A program memory 125 stores the focusing control program to be interpreted and executed by the CPU 119. A work memory 126 is used for writing and reading various types of data when the CPU 119 performs processing according to the program stored in the program memory 125. Furthermore, a display operation unit 127 displays an operating state of the camera and various types of warnings, and a monitor 128 displays an image.

An operation unit, a detection unit, a timer unit, and so on according to the specifications of the camera may be provided. For example, a setting switch (SW) 129 is used for performing various types of setting. A cross switch (SW) 130 is used for selecting menu items displayed on the display operation unit 127 and the monitor 128 and issuing an instruction to move the position of an AF frame. A face detection unit 131 detects a face for a captured image signal. A timer 132 measures time.

The electronic camera according to the exemplary embodiment of the present invention will be described referring to a flowchart of FIG. 2. In step S201, the CPU 119 determines a state (ON/OFF) of the SW1 for issuing an instruction to prepare imaging. The processing proceeds to step S205 if the state is ON (YES in step S201), while proceeding to step S202 when the state is OFF (No in step S201).

In step S202, based on a control signal from the CPU 119, an AE operation is performed such that the brightness of the image displayed on the monitor 128 becomes appropriate by using a driving control unit in the imaging optical system to control the diaphragm/shutter 105 and the shutter speed.

In step S203, under the control of the CPU 119, an automatic white balance (AWB) operation is performed such that the image displayed on the monitor 128 has a suitable color balance regardless of the color temperature of a light source.

In step S204, the CPU 119 performs processing of an image signal read from the image sensor 112, to display the image on the monitor 128. In step S205, the CPU 119 performs imaging processing according to a procedure, described below.

Figure 2:
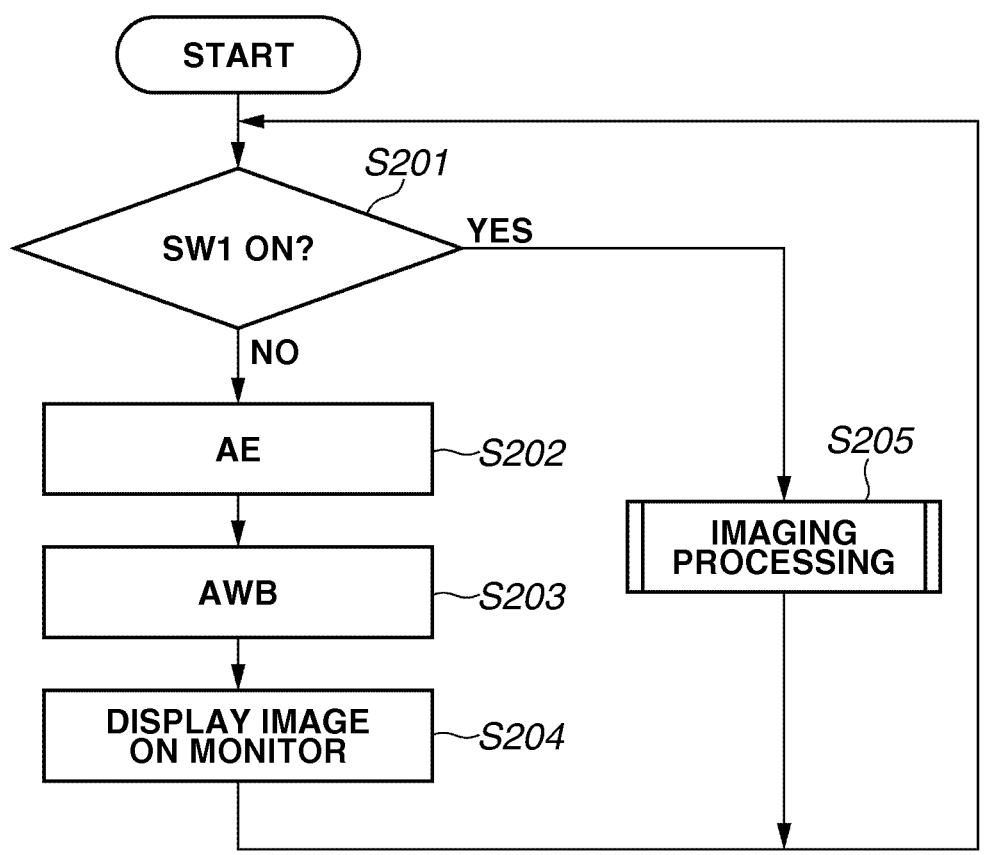
FIG. 2 is a flowchart illustrating a procedure for basic processing of the electronic camera according to the first exemplary embodiment.
Figure 3:
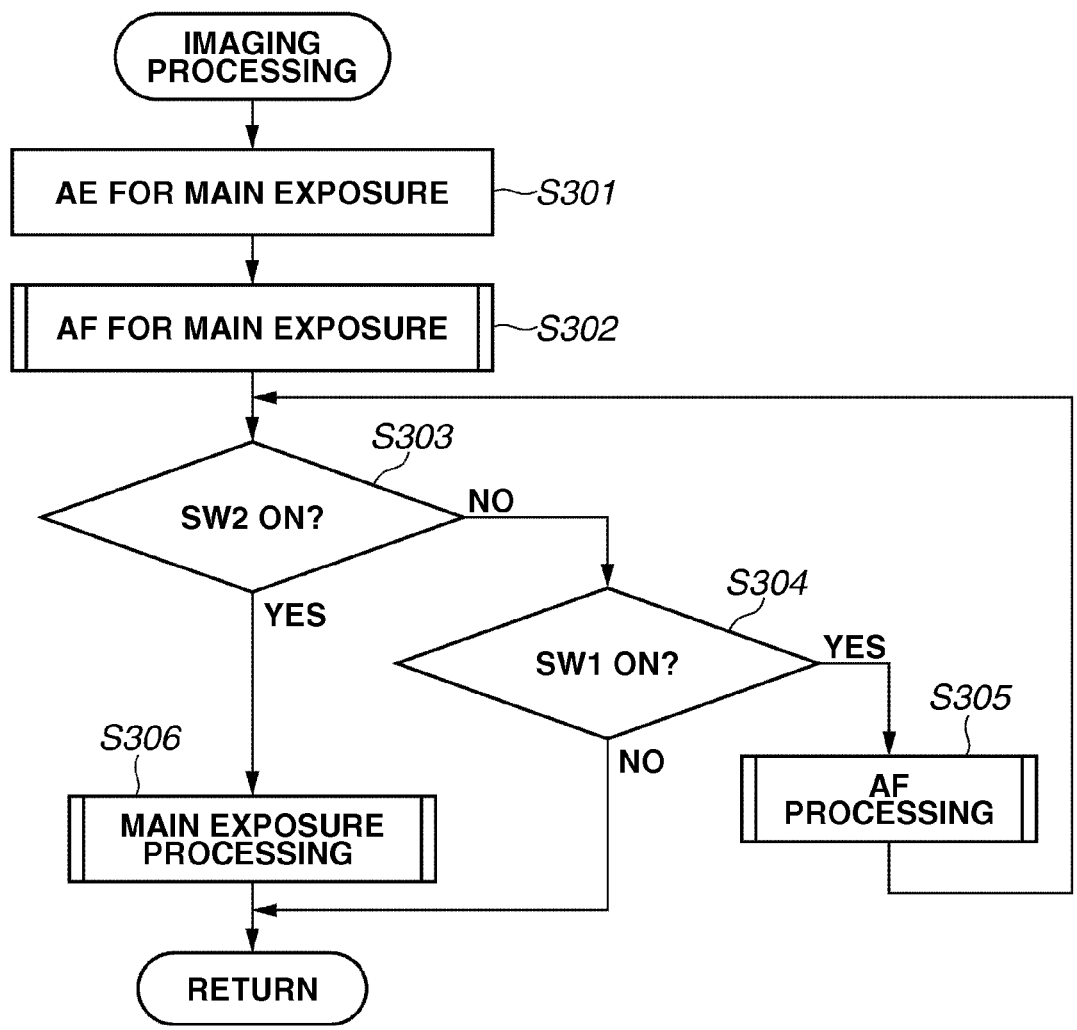
FIG. 3 is a flowchart illustrating a procedure for imaging processing according to the first exemplary embodiment.

FIG. 3 is a flowchart illustrating the imaging processing in step S205 in FIG. 2.

In step S301, the CPU 119 performs an AE operation for main exposure. In step S302, the CPU 119 performs an AF operation for main exposure according to a procedure, described below.

In step S303, the CPU 119 determines a state (ON/OFF) of the SW2. The processing proceeds to step S306 if the state of SW2 is ON (YES in step S303), while proceeding to step S304 when the state of SW2 is OFF (NO in step S303).

In step S304, the CPU 119 determines a state (ON/OFF) of the SW1. The processing proceeds to step S305 if the state of SW1 is ON (YES in step S304), while finishing this processing when the state of SW1 is OFF (NO in step S304). In step S305, the processing returns to S303 after the CPU 119 performs an AF operation according to a procedure described below. In step S306, the CPU 119 performs main exposure and recording according to a procedure described below.

Figure 4:
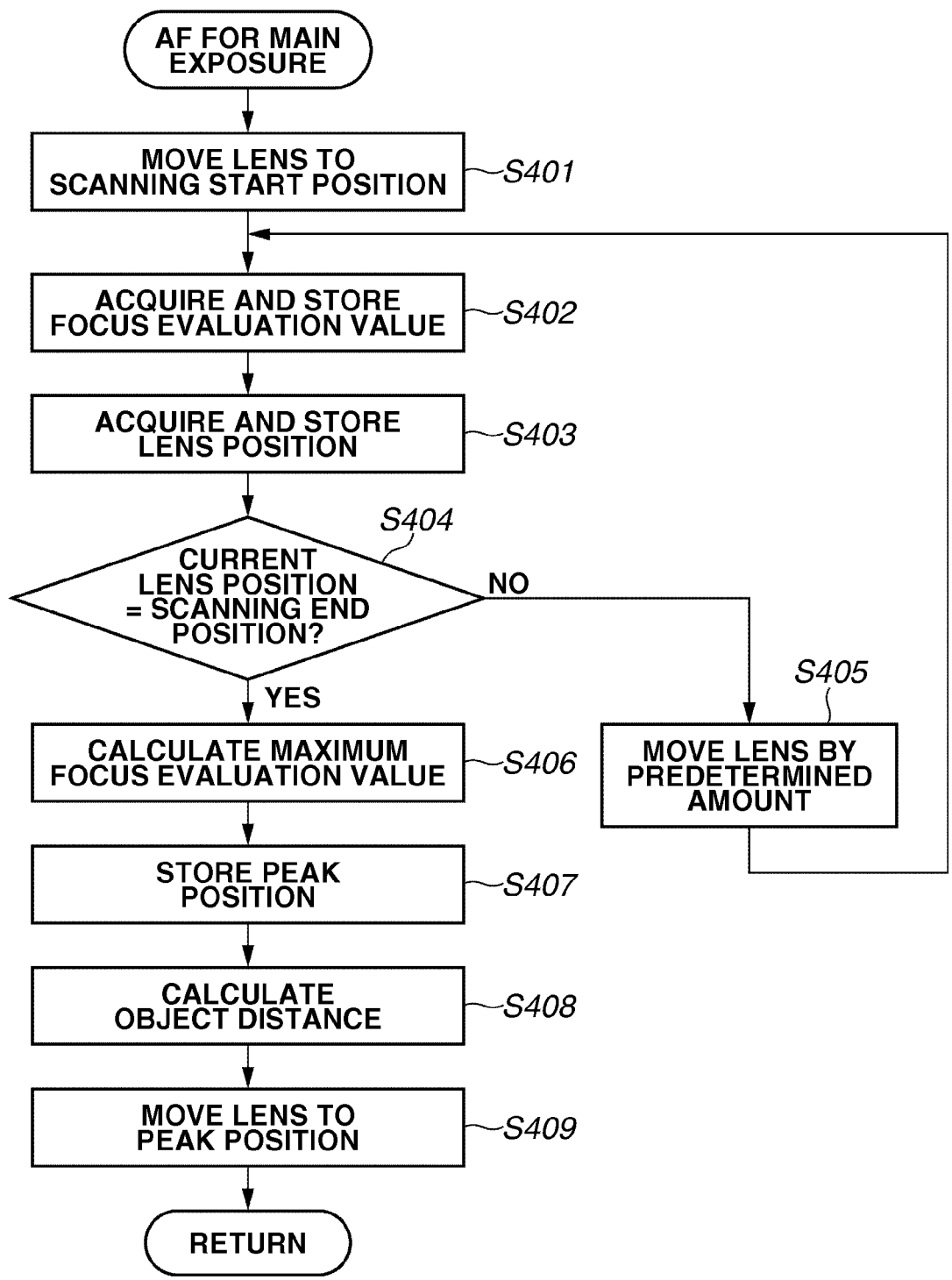
FIG. 4 is a flowchart illustrating a procedure for AF processing for main exposure according to the first exemplary embodiment.

FIG. 4 is a flowchart illustrating the AF operation for main exposure in step S302 in FIG. 3.

First, in step S401, the CPU 119 moves the focus lens 101 to a scanning start position by issuing a control signal to the focus lens driving circuit 104. The scanning start position may be an infinite distance end in a focusable region, for example.

In step S402, after causing the A/D converter 113 to convert an analog video signal read from the image sensor 112 into a digital signal and causing the image processor 115 to extract high-frequency components of a luminance signal from the output digital signal, the CPU 119 stores in the work memory 126 a focus evaluation value obtained based on the high-frequency components as a focus signal.

In step S403, the CPU 119 acquires the current position of the focus lens 101 and stores the current position in the work memory 126. When a stepping motor is used for the focus lens driving motor 103, for example, a relative number of driving pulses counted from the initial position detected by the photointerrupter 102 can be used as a position of the focus lens 101. Alternatively, information relating to the position of the focus lens 101 may be obtained by detecting an absolute position using a rotary encoder or the like (not illustrated).

In step S404, the CPU 119 examines whether or not the current position of the focus lens 101 is equal to a scanning end position. The processing proceeds to step S406 if both the positions are equal to each other (YES in step S404). Otherwise (NO in step S404), the processing proceeds to step S405. The scanning end position is a closest distance end within a focusable region, for example.

In step S405, the processing returns to step S402, after the CPU 119 moves the focus lens 101 by a predetermined amount toward a scanning end direction by the control signal sent out to the focus lens driving circuit 104 from the CPU 119.

In step S406, the CPU 119 calculates the maximum focus signal (e.g., evaluation value) acquired in step S402. In step S407, the CPU 119 stores in the work memory 126 a position of the focus lens 101 at a time when the maximum focus signal calculated in step S406 is acquired (hereinafter referred to as a peak position). That is, the CPU 119 stores an output signal from the image processor 115, associating with the position of the focus lens 101.

In step S408, a distance from the camera to the object is calculated based on the peak position stored in step S407 according to the program executed by the CPU 119.

At this time, the CPU 119 can convert the position of the focus lens 101 into an object distance (a distance from the camera to the object) using the optical characteristics of the lens used in the camera, the focal length of the zoom lens 108 when AF is performed, adjustment data at the time of manufacturing, and so on.

In step S409, the CPU 119 moves the focus lens 101 to the peak position stored in step S407 based on the control signal sent out to the focus lens driving circuit 104 from the CPU 119.

FIG. 5 is a flowchart illustrating the AF operation in step S305 in FIG. 3.

First, in step S501, the CPU 119 compares the object distance calculated in step S408 in FIG. 4 with a predetermined distance, i.e., a previously determined threshold value (a reference distance value). The processing proceeds to step S502 if the object distance is larger than the threshold value (YES in step S501). Otherwise (NO in step S501), the processing proceeds to step S505.

In step S502, under the control of the CPU 119, a time interval T for repeating the focus adjusting operation of the AF, i.e., a time interval between a focus adjusting operation and the next focus adjusting operation, is set to T1.

In step S503, a scanning range R for the current focus adjusting operation is set to R1. The scanning range R corresponds to the entire amount of movement, i.e., a movable range of the focus lens 101 in a certain focus adjusting operation.

In step S504, a scanning step S for the current focus adjusting operation is set to S1. The scanning step corresponds to the amount of movement of the focus lens 101 to be controlled to move each time a signal representing high-frequency components of a luminance signal is stored during a period of a certain focus adjusting operation.

In step S505, the time interval T, between the focus adjusting operations, is set to T2. In step S506, the scanning range R is set to R2, and in step S507, the scanning step S is set to S2.

In the description from step S502 to step S507, the time interval T, the scanning range R, and the scanning step S have relationship of T1>T2, R1<R2, and S1<S2, that is, they are set to satisfy the following conditions under the control of the CPU 119.

The time interval T when the object distance is farther is set to be longer than the time interval T when the object distance is closer.

The scanning range R when the object distance is farther is set to be narrower, than the scanning range R when the object distance is closer.

The scanning step S when the object distance is farther set to be smaller than the scanning step S when the object distance is closer.

In step S508, the CPU 119 outputs a signal to the focus lens driving circuit 104, to move the focus lens 101 to a scanning start position. The scanning start position can be obtained by "current position −R/2".

More specifically, the scanning start position is a position where the focus lens 101 is moved from the current position by the scanning range R set in step S503 or S506.

In step S509, after causing the A/D converter 113 to convert the analog video signal read from the image sensor 112 into a digital signal and send out the digital signal to the image processor 115 and causing the image processor 115 to extract high-frequency components of a luminance signal from the output digital signal, the CPU 119 stores in the work memory 126 a focus evaluation value obtained based on the high-frequency components as a focus signal.

In step S510, the CPU 119 acquires the current position of the focus lens 101 and stores data representing the position in the work memory 126.

When the stepping motor is used for driving the focus lens 101, the relative number of driving pulses counted from the initial position detected by the photointerrupter 102 can be used as positional information. However, an absolute position may be detected using a rotary encoder or the like.

In step S511, the CPU 119 determines whether or not the current position of the focus lens 101 is equal to a scanning end position. The processing proceeds to step S513 if both the positions are equal to each other (YES in step S511). Otherwise (NO in step S511), the processing proceeds to step S512. The scanning end position can be obtained by "scanning start position +R".

In step S512, the CPU 119 returns to step S509 after moving the focus lens 101 by a predetermined amount toward the scanning end position. The predetermined amount at this time is set to S set in step S504 or S507.

In step S513, the CPU 119 calculates the maximum focus signal (e.g., evaluation value) from among focus signals acquired in step S509. In step S514, the CPU 119 stores in the work memory 126 the peak position of the focus lens 101 at a time when the maximum focus signal is acquired from among the focus signals calculated in step S513.

In step S515, under the control of the CPU 119, the focus lens 101 is moved to the peak position stored in step S514.

In step S516, under the control of the CPU 119, the timer count value of the timer 132 is reset to zero. In step S517, the timer 132 starts to measure time.

In step S518, the CPU 119 determines a state of the SW2 (i.e., ON/OFF). If the state is ON (YES in step S518), the processing ends. Otherwise (NO in step S518), the processing proceeds to step S519.

In step S519, the CPU 119 compares the time measured by the timer 132 with the time interval T between the focus adjusting operations set in step S502 or S505. If the time measured by the timer 132 is T or more (YES in step S519), the processing ends. Otherwise (NO in step S519), the processing returns to step S518.

The camera configured to be controlled as illustrated in FIG. 5 operates as follows. First, the time interval T between the adjacent focus adjusting operations, the scanning range R, and the scanning step S are set according to the object distance calculated in the AF processing for main exposure illustrated in FIG. 4.

At this time, the values are set as follows utilizing the fact that even if the object moves by the same amount in a real space within the same time period, when the object is at a far distance, the depth of field is deep, so that the amount of movement of an image forming position of an object image that has passed through a lens decreases.

First, when the object distance is farther than a predetermined distance (a reference distance value, which is hereinafter referred to as a threshold value), the time interval T is set longer than the time interval T when the object distance is closer to the predetermined distance.

FIG. 6 illustrates the time interval T thus set. When the object distance is larger than the threshold value, the amount of movement of the image forming position is small. Therefore, a time period elapsed until the object image is defocused (out-of-focus) is longer, so that the time interval T is accordingly set longer.

On the other hand, when the object distance is smaller than the threshold value, the time interval T is set shorter for similar reasons. The threshold value at this time may be set to 1 m, for example.

When the object distance is larger than the threshold value, the scanning range R is set narrower than the scanning range R when the object distance is smaller than the threshold value. FIG. 7 illustrates the scanning range R thus set.

The following is the reason why the scanning range R is thus set. When the object distance is larger than the threshold value, the amount of movement of the image forming position is smaller. Therefore, the narrow scanning range R can include an in-focus position. This allows a scanning time period to be reduced.

On the other hand, when the object distance is smaller than the threshold value, the scanning range R is set wider for similar reasons. This can prevent the in-focus position from being out of the scanning range R.

Furthermore, when the object distance is larger than the threshold value, the scanning step S is set smaller than the scanning step S when the object distance is smaller than the threshold value. FIG. 7 also illustrates the scanning step S thus set, similarly to the scanning range R.

As described above, when the object distance is larger than the threshold value, the scanning range R is set narrower than the scanning range R when the object distance is smaller than the threshold value. Therefore, the scanning step S is accordingly set small.

Thereby, a sufficient number of focus signals can be acquired even within the scanning range R that is thus narrower. Therefore, it is effective in performing an interpolation operation based on the acquired focus signals to calculate a peak position.

The amount of movement of the image forming position of the object image changes depending on the focal length of the lens. Therefore, the threshold value used for determining the time interval T, the scanning range R, and the scanning step S may be changed depending on the position of the zoom lens 108.

Furthermore, even if the focal length of the lens does not change, a plurality of threshold values may be set for determining each of the time interval T, the scanning range R, and the scanning step S. In this case, three or more sets of time intervals T, scanning ranges R, and scanning steps S are provided (i.e., when the number of sets of threshold values is N, [Ti, Ri, Si], where i=1, 2, ..., N).

Figure 8:
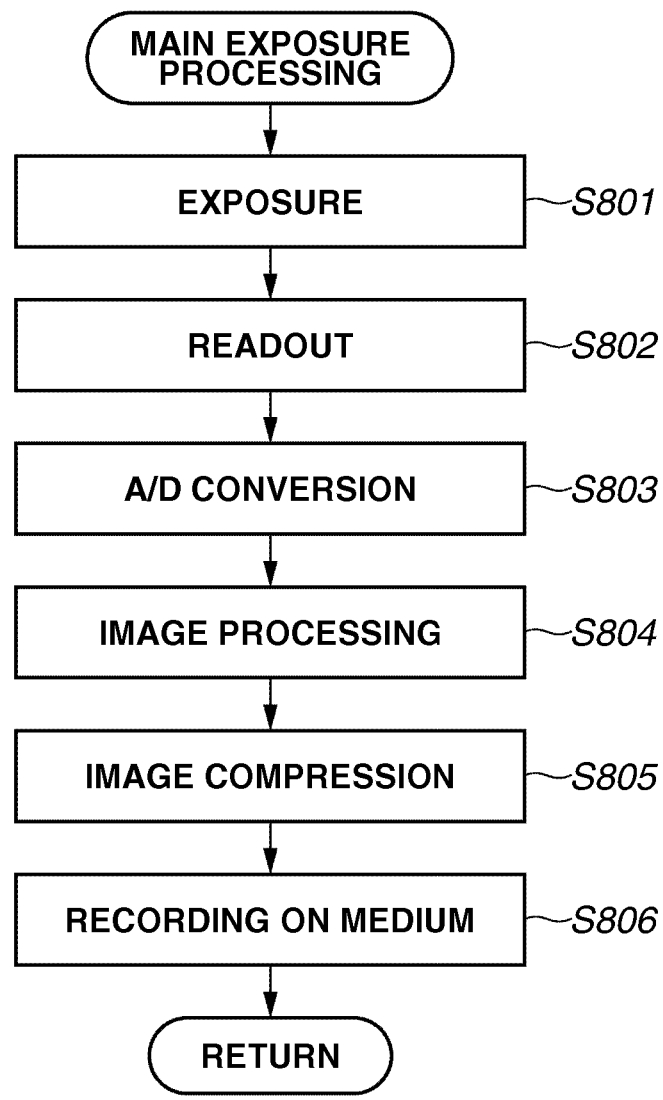
FIG. 8 is a flowchart illustrating a procedure for main exposure processing according to the first exemplary embodiment.

FIG. 8 is a flowchart illustrating the main exposure processing in step S306 in FIG. 3.

First, in step S801, the image sensor 112 is exposed. In step S802, data accumulated in the image sensor 112 is read. In step S803, the A/D converter 113 converts an analog signal read from the image sensor 112 into a digital signal. In step S804, the image processor 115 performs various types of image processing on the digital signal output from the A/D converter 113.

In step S805, under the control of the CPU 119, an image that is processed in step S804 is compressed according to a format such as Joint Photographic Experts Group (JPEG). In step S806, the CPU 119 carries out control so that the data compressed in step S805 is sent to the recording medium interface 117 and then is recorded on a recording medium 118 such as a memory card mounted on the camera main body via the recording medium interface 117.

The processing by the image sensor 112 in step S801 is performed by the CPU 119 performing control of the processing for each of the image sensor 112 and the A/D converter 113 via the timing signal generation circuit 114.

Similarly, the processing by the A/D converter 113 in steps S802 and S803 is controlled by the CPU 119. The CPU 119 performs control of the processing for each of the image sensor 112 and the A/D converter 113 via the timing signal generation circuit 114.

The processing by the image processor 115 in steps S804 to S806 is performed by the CPU 119 performing control of the processing for the imaging processor 115.

In the first exemplary embodiment, the processing in step S806 may be performed by the CPU 119 acquiring compressed data from the image processor 115 and recording the acquired compressed data on the recording medium 118 via the recording medium interface 117.

In the first exemplary embodiment, a program (a main program) corresponding to the procedure for the basic processing of the camera (see FIG. 2) is stored in the program memory 125.

Furthermore, a predetermined program including respective programs (sub-programs) corresponding to the procedures for the imaging processing (see FIG. 3), the AF processing for main exposure (see FIG. 4), the subsequent AF processing (see FIG. 5), and the main exposure processing (see FIG. 3) is also stored in the program memory 125.

The respective programs (sub-programs) corresponding to the procedures for the AF processing for main exposure and the subsequent AF processing (see FIGS. 4 and 5) in the predetermined program correspond to the focusing control program described above.

The CPU 119 reads and executes the predetermined program including the focusing control program from the program memory 125, to perform the basic processing of the camera, the imaging processing, the AF processing for main exposure, and the subsequent AF processing. The CPU 119 also controls constituent elements associated with the main exposure processing (the image sensor 112, the A/D converter 113, and the image processor 115).

As described above, according to the first exemplary embodiment, changing the time interval T in repeating the focus adjusting operation depending on the object distance enables a useless focus adjusting operation to be eliminated when the object is at a far distance, while enabling a focus adjusting operation to be performed before the object image becomes an out-of-focus state when the object is at a close distance.

Furthermore, changing the scanning range R depending on the object distance can eliminate the possibility that the scanning time period becomes uselessly long when the object is at a far distance.

This can further eliminate the possibility that the object image cannot be focused due to the insufficient scanning range R when the object is at a close distance.

Furthermore, changing the scanning step S depending on the object distance enables the setting of the scanning step S having a suitable width according to the scanning range R.

This enables a number of focus signals to be reliably acquired even when the scanning range is set narrower.

An electronic camera according to a second exemplary embodiment of the present invention will be described in detail below. Although in the foregoing description, the time interval between the focus adjusting operations, the scanning range, the scanning step are changed according to the object distance obtained by the result of the AF for main exposure, they may be changed according to the result of determination whether or not the object image can be focused. The operation of the electronic camera thus configured will be described below.

Figure 9:
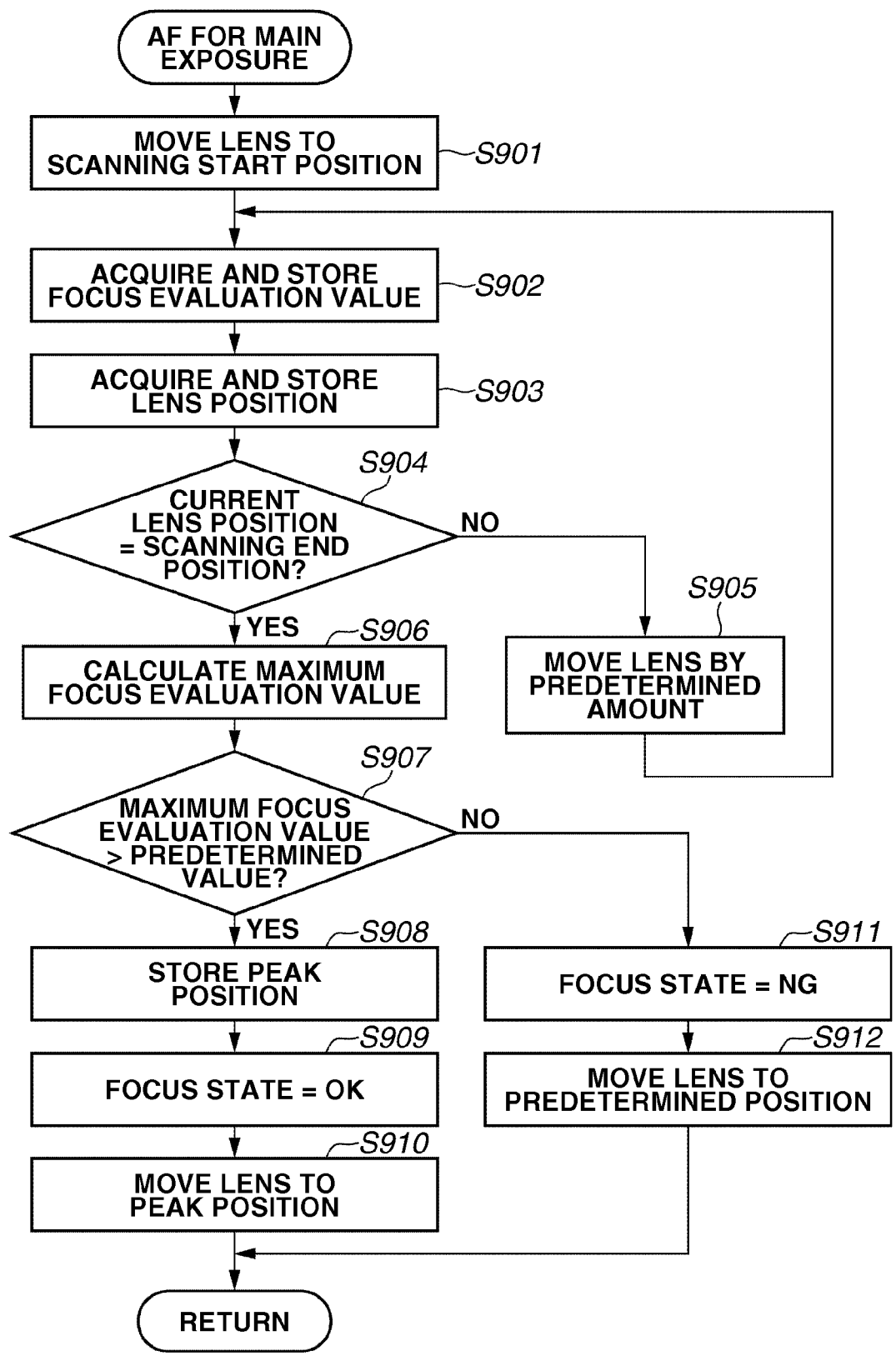
FIG. 9 is a flowchart illustrating a procedure for AF processing for main exposure according to a second exemplary embodiment.

FIG. 9 is a flowchart illustrating an AF operation for main exposure different from the AF operation in part illustrated in FIG. 4 in the first exemplary embodiment.

First, in step S901, a CPU 119 moves a focus lens 101 to a scanning start position by sending out a signal to a focus lens driving circuit 104. The scanning start position is an infinite end within a focusable region, for example.

In step S902, after an A/D converter 113 converts an analog video signal read out from an image sensor 112 into a digital signal. Then, the output digital signal is sent out to an image processor 115. The image processor 115 extracts high-frequency components of a luminance signal from the output digital signal, the CPU 119 stores in a work memory 126 a focus evaluation value obtained based on the high-frequency components as a focus signal.

In step S903, the CPU 119 acquires the current position of the focus lens 101 and stores it in the work memory 126. The position information of the focus lens 101 is acquired, as described above.

In step S904, the CPU 119 determines whether or not the current position of the focus lens 101 is equal to a scanning end position. The processing proceeds to step S906 if both the positions are equal to each other (YES in step S904). Otherwise (NO in step S904) the processing proceeds to step S905. The scanning end position is a closest distance end within a focusable region, for example.

In step S905, under the control of the CPU 119, the focus lens 101 is moved by a predetermined amount toward a scanning end direction.

In step S906, the CPU 119 calculates the maximum focus signal (i.e., evaluation value) acquired in step S902. In step S907, the CPU 119 compares the maximum focus signal calculated in step S906 with a predetermined value (a reference evaluation value). The processing proceeds to step S908 if the maximum focus signal is larger than the predetermined value (YES in step S907). Otherwise (NO in step S907), the processing proceeds to step S911.

In step S908, the CPU 119 stores in the work memory 126 a peak position of the focus lens 101 at a time when the maximum focus signal calculated in step S906 is acquired. Thereafter, in step S909, the CPU 119 stores a focus state as OK (focusable) in the work memory 126.

In step S910, the CPU 119 sends out a signal to the focus lens driving circuit 104, to move the focus lens 101 to the peak position stored in step S908.

In step S911, the CPU 119 stores the focus state as NG (not focusable) in the work memory 126. In step S912, the CPU 119 sends out a signal to the focus lens driving circuit 104, to move the focus lens 101 to a predetermined position.

The predetermined position at this time is set to a position corresponding to a so-called hyperfocal distance including an infinite distance at a far end within a depth of field. Alternatively, the predetermined position may be set to a center of a focusable range.

Figure 10:
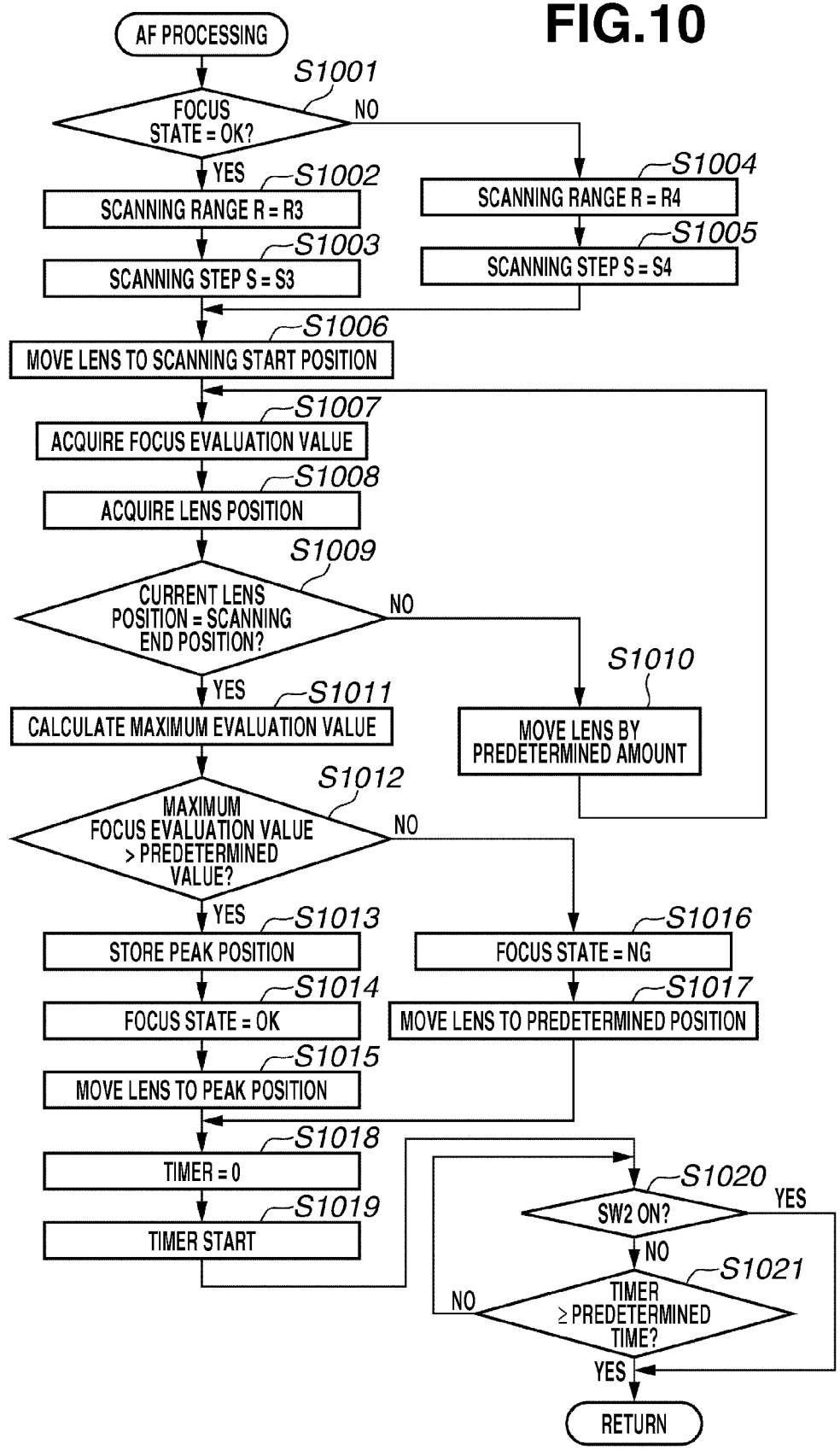
FIG. 10 is a flowchart illustrating a procedure for AF processing according to the second exemplary embodiment.

FIG. 10 is a flowchart illustrating an AF operation different from the AF operation in part in step S305 illustrated in FIG. 3.

First, in step S1001, the CPU 119 checks the focus state stored in step S909 or S911 illustrated in FIG. 9 or an focus state to be stored in step S1014 or S1016, described below. The processing proceeds to step S1002 if the state is OK (focusable) (YES in step S1001), while proceeding to step S1004 if the state is NG (not focusable) (NO in step S1001).

In step S1002, the CPU 119 sets a scanning range R for the current focus adjusting operation to R3. In step S1003, the CPU 119 sets a scanning step S for the current focus adjusting operation to S3.

On the other hand, in step S1004, the CPU 119 sets the scanning range R for the current focus adjusting operation to R4. In step S1005, the CPU 119 sets the scanning step S for the current focus adjusting operation to S4 in step S1005.

In the description from step S1002 to step S1005, the scanning range R and the scanning step S are set to have relationship of R3<R4 and S3>S4, in other words, they are set to satisfy the following conditions under the control of the CPU 119.

The scanning range R is set wider when the result of determination whether or not an object image can be focused is NG than that when the result of the determination is OK.

The scanning step S is set smaller when the result of the determination whether or not an object image can be focused is NG than that when the result of the determination is OK.

In step S1006, the CPU 119 sends out a signal to the focus lens driving circuit 104, to move the focus lens 110 to a scanning start position.

The scanning start position can be obtained by "current position −R/2". That is, a position to which the focus lens 101 is moved by the scanning range R set in step S1002 or S1004 from the current position is set as the scanning start position.

In step S1007, the A/D converter 113 converts an analog video signal read out from the image sensor 112 into a digital signal. Then, the digital signal is sent out to the image processor 115 and the image processor 115 extracts high-frequency components of a luminance signal from the output digital signal. The CPU 119 acquires and stores in the work memory 126 a focus evaluation value based on the high-frequency components as a focus signal.

In step S1008, the CPU 119 acquires the current position of the focus lens 101 and stores it in the work memory 126. The position information of the focus lens 101 is acquired, as described above.

In step S1009, the CPU 119 checks whether or not the current position of the focus lens 101 is equal to a scanning end position. The processing proceeds to step S1011 when both the positions are equal to each other (YES in step S1009). Otherwise (NO in step S1009), the processing proceeds to step S1010. The scanning end position is determined by "scanning start position +R".

In step S1010, the focus lens 101 is moved by a predetermined amount toward a scanning end direction. The predetermined amount at this time is set to S that has been set in step S1003 or S1005.

In step S1011, the CPU 119 calculates the maximum focus signal acquired in step S1007. In step S1012, the CPU 119 compares the maximum focus signal calculated in step S1011 with a predetermined value (a reference evaluation value). The processing proceeds to step S1013 if the maximum focus signal is larger than the predetermined value (YES in step S1012). Otherwise (NO in step S1012), the processing proceeds to step S1016.

In step S1013, the CPU 119 stores in the work memory 126 a peak position of the focus lens 101 at a time when the maximum focus signal calculated in step S1011 is acquired. In step S1014, the CPU 119 stores a focus state as OK in the work memory 126.

In step S1015, the CPU 119 sends out a signal to the focus lens driving circuit 104, to move the focus lens 101 to the peak position stored in step S1013.

In step S1016, the CPU 119 stores the focus state as NG in the work memory 126. In step S1017, the CPU 119 sends out a signal to the focus lens driving circuit 104, to move the focus lens 101 to a predetermined position.

The predetermined position at this time is a position corresponding to a so-called hyperfocal distance including an infinite distance within a far end of a depth of field. Alternatively, the predetermined position may be set to a center of a focusable range.

In step S1018, under the control of the CPU 119, the timer 132 is reset, to make a timer count value zero. In step S1019, the timer 132 starts to measure time. In step S1020, the CPU 119 determines a state of an imaging processing instruction switch (SW2). The processing is terminated if the state is ON (YES in step S1020). Otherwise (NO in step S1020), the processing proceeds to step S1021.

In step S1021, the CPU 119 compares the time measured by the timer 132 with a predetermined time period (a reference comparison time period). The processing is terminated if the time measured by the timer 132 is not less than the predetermined time period (YES in step S1021). Otherwise (NO in step S1021), the processing returns to step S1020.

The operation of the electronic camera configured as illustrated in FIG. 10 is as follows. First, the CPU 119 sets a scanning range R and a scanning step S according to the focus state determined in the AF processing for main exposure illustrated in FIG. 9.

Figure 11A:
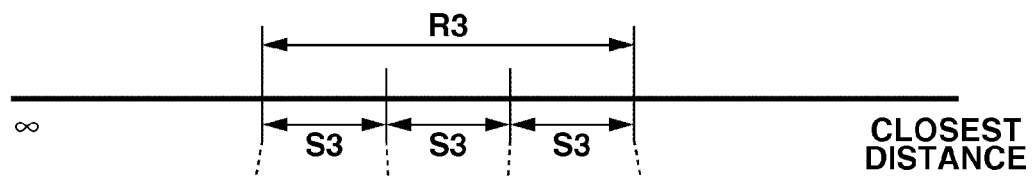
FIG. 11 illustrates a scanning range and a scanning step to be set in the AF processing according to the second exemplary embodiment.
Figure 11B:
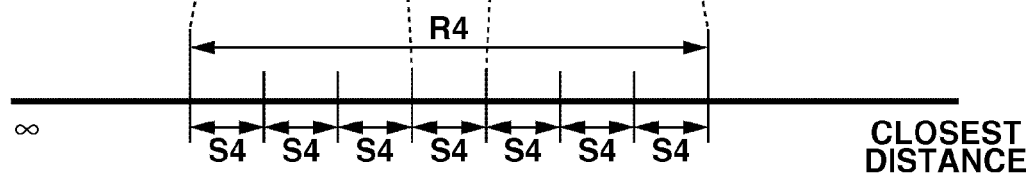

At this time, the scanning range R when the focus state is OK is narrower than that when the focus state is NG. This will be described referring to FIG. 11.

The following is the reason for this. If the focus state is OK, an in-focus position has been found. Therefore, scanning only the vicinity of the previous in-focus position in the subsequent scanning enables the in-focus position to be detected. This eliminates the time spend on the focus adjusting operation.

On the other hand, when the focus state is NG, an in-focus position is not found in advance. Therefore, scanning a wider range in the subsequent scanning increases the possibility that the in-focus position can be detected.

The scanning step S when the in-focus state is NG is narrower than that when the in-focus state is OK. The reason for this is that the detection accuracy of the in-focus position can be made higher by setting the scanning step S when the in-focus state is NG narrower than that when the in-focus state is OK, resulting in the increase in the possibility that the in-focus state becomes OK in the subsequent focus adjusting operation.

In the second exemplary embodiment, a program (main program) corresponding to the above-described procedure for the basic processing of the electronic camera (see FIG. 2) is stored in the program memory 125.

A predetermined program including programs (sub-programs) respectively corresponding to the procedures for the imaging processing (see FIG. 3), the AF processing for main exposure (see FIG. 9), the subsequent AF processing (see FIG. 10), and the main exposure processing (see FIG. 8) is also stored in the program memory 125.

The respective programs (sub-programs) corresponding to the procedures for the AF processing for main exposure and the subsequent AF processing (see FIGS. 9 and 10) in the predetermined program correspond to the above-mentioned focusing control program.

The CPU 119 reads out the predetermined program including the focusing control program from the program memory 125 and executes the predetermined program, thereby performing the basic processing of the electronic camera, the imaging processing, the AF processing for main exposure, and the subsequent AF processing while controlling constituent elements associated with the main exposure processing (the image sensor 112, the A/D converter 113, and the image processor 115).

In the second exemplary embodiment, the focus state is determined to change the scanning range depending on the result thereof. Thus, the focus adjusting operation can be efficiently performed, the possibility that the in-focus position is detected can be increased. This can also make the detection accuracy of the in-focus position higher.

In the exemplary embodiments, the program such as the focusing control program (software for realizing the control function) is recorded on the program memory serving as the recording medium. However, the focusing control program may be also provided in the following manner.

At least the focusing control program may be stored in a computer-readable recording medium (corresponding to a removable recording medium 118, for example), such as a memory card, and delivered. In this case, the CPU 119 executes the program recorded on the recording medium after installing the program. Examples of a destination for installation of this program (at least the focusing control program) include a memory such as a RAM.

The electronic camera may be connected to a program providing apparatus outside the electronic camera, for example, a computer via a communication line (e.g., a wired communication line such as a cable and a wireless communication line). The electronic camera may download at least the focusing control program from the computer and then execute the program. Examples of a destination for downloading of this program (at least the focusing control program) include a memory such as a RAM.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-235786 filed Sep. 13, 2008, which is hereby incorporated by reference herein in its entirety.

What is claimed is:

1. An autofocus apparatus comprising:
    an imaging unit configured to capture an object image entered through a focus lens and output image data;
    a detection unit configured to detect a focus signal representing a contrast state of the object image based on the image data;
    a focus adjustment unit configured to repeatedly perform a focus adjusting operation for adjusting a position of the focus lens based on the detected focus signal during a period from receiving an instruction of the focus adjusting operation and until receiving an instruction of a recording processing;
    a storage unit configured to store focus information indicating whether or not the object image is in-focus state in the focus adjusting operation; and
    a setting unit configured to set a scanning range of the focus lens for acquiring the focus signal in the subsequent focus adjusting operation based on the focus information;
        wherein the setting unit sets the scanning range in a first range in the case that the focus information indicates that the object image is in-focus state, and sets the scanning range in a second range which is wider than the first range in the case that the focus information indicates that the object image is not in-focus state.

2. The autofocus apparatus according to claim 1, wherein the setting unit sets the amount of movement of the focus lens larger in the case that the focus information indicates that the object image is in-focus state than in the case that the focus information indicates that the object image is not in-focus state.

3. The autofocus apparatus according to claim 1, wherein the first range and the second range are the ranges centered on the current position of the focus lens.

4. The autofocus apparatus according to claim 1, wherein the setting unit sets an amount of movement of the focus lens for acquiring the focus signal in the subsequent focus adjusting operation based on the focus information.

5. A method for controlling an autofocus apparatus including a focus adjustment unit configured to repeatedly perform a focus adjusting operation for adjusting a position of a focus lens according to a focus signal, which represents in-focus state of an object image, detected based on captured image data, the method comprising:
    storing focus information indicating whether or not the object image is in-in-focus state in the focus adjusting operation;
    setting, when the focus adjusting operation is repeatedly performed during a period from receiving an instruction of the focus adjusting operation and until receiving an instruction of a recording processing, a scanning range of the focus lens for acquiring the focus signal in the subsequent focus adjusting operation based on the focus information,
    wherein the setting step sets the scanning range in a first range in the case that the focus information indicates that the object image is in-focus state, and sets the scanning range in a second range which is wider than the first range in the case that the focus information indicates that the object image is not in-focus state.

6. An apparatus comprising:
    an imaging unit configured to capture an object image entered through a focus lens and output image data;
    a detection unit configured to detect a focus signal representing a contrast state based on the image data;
    a focus adjustment unit configured to repeatedly perform a focus adjusting operation for adjusting a position of the focus lens based on the detected focus signal; and
    a controller configured to acquire information corresponding to a distance to an object,
    wherein the controller sets a time interval between the focus adjusting operations in the case that the distance to the object is a first distance shorter than a time interval between the focus adjusting operations in the case that the distance to the object is a second distance that is farther than the first distance.

7. The apparatus according to claim 6, wherein the controller sets a scanning range of the focus lens in the case that the distance to the object is a first distance wider than a scanning range of the focus lens in the case the distance to the object is a second distance that is farther than the first distance.

8. The apparatus according to claim 6, wherein the controller set an amount of movement of the focus lens in the case that the distance to the object is a first distance larger than an amount of movement of the focus lens in the case that the distance to the object is a second distance that is farther than the first distance.

9. A method comprising:
    capturing an object image entered through a focus lens and outputting image data;
    detecting a focus signal representing a contrast state based on the image data;
    adjusting a position of the focus lens based on the detected focus signal;
    acquiring information corresponding to a distance to an object; and
    setting a time interval in acquiring the focus signal in the subsequent focus adjusting operation according to the information relating to the distance to the object,
    wherein the setting further comprises setting the time interval in the case that the distance to the object is a first distance shorter than the time interval in the case that the distance to the object is a second distance that is farther than the first distance.

10. The method according to claim 9, wherein the setting further comprises setting a scanning range of the focus lens in the case that the distance to the object is a first distance wider than a scanning range of the focus lens in the case that the distance to the object is a second distance that is farther than the first distance.

11. The method according to claim 9, wherein the setting further comprises making an amount of movement of the focus lens in the case that the distance to the object is a first distance larger than an amount of movement of the focus lens in the case that the distance to the object is a second distance that is farther than the first distance.

12. An autofocus apparatus comprising:
    an imaging unit configured to capture an object image entered through a focus lens and output image data;
    a detection unit configured to detect a focus signal representing a contrast state of the object image based on the image data;
    a focus adjustment unit configured to repeatedly perform a focus adjusting operation for adjusting a position of the focus lens based on the detected focus signal during a period from receiving an instruction of the focus adjusting operation and until receiving an instruction of a recording processing;
    a storage unit configured to store focus information indicating whether or not the object image is in-focus state in the focus adjusting operation; and
    a setting unit configured to set a scanning range of the focus lens for acquiring the focus signal in the subsequent focus adjusting operation based on the focus information;
    wherein the setting unit sets the scanning range in a second range in the case that the focus information indicates that the object image is not in-focus state, and sets the scanning range in a first range which is narrower than the second range in the case that the focus information indicates that the object image is in-focus state.

13. The autofocus apparatus according to claim 12, wherein the setting unit sets the amount of movement of the focus lens larger in the case that the focus information indicates that the object image is in-focus state than in the case that the focus information indicates that the object image is not in-focus state.

14. A method for controlling an autofocus apparatus including a focus adjustment unit configured to repeatedly perform a focus adjusting operation for adjusting a position of a focus lens according to a focus signal, which represents in-focus state of an object image, detected based on captured image data, the method comprising:
    storing focus information indicating whether or not the object image is in-in-focus state in the focus adjusting operation;
    setting, when the focus adjusting operation is repeatedly performed during a period from receiving an instruction of the focus adjusting operation and until receiving an instruction of a recording processing, a scanning range of the focus lens for acquiring the focus signal in the subsequent focus adjusting operation based on the focus information,
    wherein the setting step sets the scanning range in a second range in the case that the focus information indicates that the object image is not in-focus state, and sets the scanning range in a first range which is narrower than the second range in the case that the focus information indicates that the object image is in-focus state.

* * * * *